Patented Feb. 21, 1928.

1,660,094

UNITED STATES PATENT OFFICE.

JOHANNES SCHEIBER AND WALTHER NOACK, OF LEIPZIG, GERMANY.

PROCESS FOR THE PREPARATION OF A NEW TYPE OF SHELLAC SUBSTITUTES.

No Drawing. Application filed April 15, 1926, Serial No. 102,303, and in Germany May 29, 1925.

The object of numerous attempts of preparing shellac substitutes was to produce resinous substances which showed one or the other essential technical properties of the genuine natural product to a greater or lesser extent. However, they exhibited no analogy to the natural product as regards the chemical constitution. The impossibility of bringing about a greater chemical relation between the artificial and the natural product is a disadvantage that shows itself in the different properties, so that there can be no doubt that the artificial shellac is altogether a different product from the natural shellac.

The present invention has for its object a process by which a new type of resins is prepared which as regards their chemical constitution is in so far analogous with the natural shellac, as it is possible at all as far as the present state of art and science goes. Investigations on pure shellac resin have shown that it is essentially a combination of two acids, viz,—the aleuritinic acid and the shelloic acid. The aleuritinic acid is a trioxypalmitinic acid, in which the position of the different hydroxyl groups is not cleared up yet. At regards the shelloic acid it is unknown what its constitution may be; it is only known that it is an oxycarboxylic acid of a hydroaromatic nature. By heating a mixture of aleuritinic acid and shelloic acid (according to Harries and Nagel, Chem. Centr. Bl. 1924 II, 1187) one can effect a partial synthesis only inasmuch as shellac like resins are formed. Practically that is of no importance because neither aleuritinic acid nor shelloic acid can be obtained by a synthetic method, but are dependent upon the natural shellac as an initial product for their preparation.

We have now found that we can combine quite generally oxycarboxylic acids of an aliphatic nature with oxycarboxylic acids of a hydroaromatic character forming resins by simple heating, which resins are apparently analogous to shellac and possess a lactid constitution. Although that fact may not be very surprising, it must be recognized that in spite of the great chemical differences which are present between the said components and the natural shellac acids, the lactid combinations have an astonishing similarity with the properties of the natural shellac. This can be specially proved by their behaviour to solvents, the new products possessing the same characteristic properties of the natural shellac as regards solubility in alcohol, bases, carbonates and borax especially, whereas they are insoluble in white spirit, benzol, oil of turpentine and fatty oils. Such is all the more surprising, if we consider the atomic groups, which, as a rule, are of essential importance. The fact that one can employ instead of aleuritinic acid and the shelloic acid other substitutes which are easily obtainable, means a very great improvement in technical respect, because the consumer is no longer dependent upon the possibility or impossibility of obtaining the raw material from abroad.

The artificial products, i. e. the substitutes can be prepared in a very light and bright colour provided suitable raw materials are employed. The solutions of those substitutes are often even brighter than those obtained with bleached shellac. Since the accompanying impurities of the natural shellac (lac dye and erythrolaccin) causing a decoloration are absent, the solutions of the artificial resins in alkali and borax are of a light colour.

The application of the artificial products can take place for all purposes, for which natural shellac has been used up to present, viz., varnishing, polishing insulating, preparation of mica, or in aqueous solutions (by means of weak alkalis or borax, for dressing purposes, preparation of water-colours, inks, and so forth. The new products surpass in that respect all the other substitutes hitherto known by their universality, which has never been attained by any shellac substitute. By a suitable choice of the components of the raw material which can be varied in many respects the properties of the new resins can be modified at will, especially as regards fusing points, acidity, viscosity of the solutions and so forth, so that they can be adapted for all purposes. In addition to these properties there is their absolute inodorousness and their resistance to the action of light.

When we speak of replacing the aleuritinic acid as competent we mean all the oxycarboxylic acids of aliphatic nature. Especially mixtures of aliphatic polyoxycarboxylic acids have proved suitable which are prepared by a moderate oxidation of unsaturated aliphatic acids, f. i. by means of permanganate or air. Other oxyacids are also suitable, especially castor oil fatty acids and even lactic acid.

We mean by shelloic acid as component all hydroaromatic oxycarboxylic acids which are easily prepared by a moderate oxidation of so-called resinol-acids, as mancopalol acid, abietinic acid and so forth.

The condensation of the two components can take place in molecular proportions or in another proportion since both kinds of initial products can be exchanged with each other to a certain extent. The formation of resin is effected by simple heating, preferably in a vacuum and the combination can be assisted by condensing agents such as acids, salts, and certain bases.

Example 1.

30 parts by weight of linseed oil acids and 30 parts by weight of mancopalol acid (or soluble i. e. soft Manila copal) are suspended in 500 parts by weight of water and brought into solution by the addition of a sufficient quantity of alkali. We add to this solution, at a moderate temperature of 15 to 20° C. and stirring all the while gradually.

30 parts by weight of potassium permanganate dissolved in 1000 parts by weight of water.

After the whole of the permanganate has been added, the mass is separated from the manganese peroxide by filtration and the mixture of the oxidized components is precipitated by an acid and washed. The product of reaction is then heated to 100° C. until all the water has been driven out and the temperature is then raised to 150° C. and kept at that temperature so long until a resinous mass is produced which is easily flowing and quickly solidifies in the cold.

The fusing point of the product thus obtained is about 90° C. The resin easily dissolves with a light yellow colour in alcohol, alkali carbonate and borax, but is insoluble in fatty oils, benzol and white spirit.

Example 2.

100 parts by weight of oxidized rosin and 25 parts by weight of lactic acid are heated so long until a resin is formed which solidifies in the cold. It is easily soluble in alcohol, as well as in a borax solution whereby it is differentiated from the resin obtained by heating oxidized rosin alone.

Example 3.

100 parts by weight of oxidized soluble Manila copal, 100 parts by weight of oxidized rosin and 25 parts by weight of castor oil acids are heated and the temperature is gradually raised to about 200° C. As soon as the mass flows quietly it is heated in a vacuum until the froth setting in at a later period has gone down.

The resin is soluble in alcohol, alkali carbonate and borax solution and insoluble in hydrocarbons and fatty oils.

In place of the common Manila copal which is soluble in alcohol, hard Manila copal can also be employed.

Example 4.

100 parts by weight of oxidized Manila copal, 100 parts by weight of oxidized rosin, 56 parts by weight of castor oil acids and 2 parts by weight of ammonium lactate are used in the manner stated in example 3. The solubility in the different solvents equals that of the resins of the previous example. The film is excellent and shows a great body.

Example 5.

200 parts by weight of oxidized soft Manila copal, and 107 parts by weight of oxidized castor oil acids are fused in the manner stated in Example 3. The resin obtained equals the natural shellac as regards solubility. By adding a few percent of wax for instance Japan wax, carnauba wax, beeswax and the like, the film obtains a greater body. When heated the resin becomes insoluble and infusible, but by treatment with formic acid in the heat and precipitation of the solution obtained with water the resin is again reconverted into the soluble and fusible state. That behaviour fully equals that of natural shellac resin.

The film is distinguished by a great brilliancy, good body and hardness.

Example 6.

100 parts by weight of oxidized Manila copal, 100 parts by weight of oxidized rosin and 100 parts by weight of oxidized linseed oil acids are heated and the temperature gradually raised to 200° C. With a view to avoiding a dark coloration of the mass it is advisable to pass a current of carbonic acid or other inert gas through it while being heated. The resin equals as regards solubility the other resins described above.

Example 7.

100 parts by weight of Manila copal, 50 parts by weight of linseed oil acids and 25 parts by weight of castor oil acids are treated with air at a temperature of 200° C. so long until a sticky and viscous product is obtained. The fusing point of that resin is about 100° C. By the addition of a small quantity of sulphur (0.5 to 2%) a product is obtained which on protracted heating loses its solubility in alcohol and its fusibility. In other things the resin perfectly equals the natural shellac as regards solubility. The body of the film obtained is excellent and is very hard without being brittle. By an addition of wax the properties of the resin can be modified according to the different objects of application.

What we claim is:—

1. A process for the preparation of shellac substitutes which comprises combining mixtures of oxycarboxylic acids of an aliphatic nature and hydro-aromatic-oxycarboxylic acids with each other by subjecting the mixture to the action of heat.

2. A process for the preparation of shellac substitutes which comprises combining mixtures of oxycarboxylic acids of an aliphatic nature and hydro-aromatic-oxycarboxylic acids with each other by subjecting the mixture to the action of heat in the pressure of condensing agents.

3. A process for the preparation of shellac substitutes which comprises combining mixtures of the products of the moderate oxidation of mixtures of unsaturated aliphatic acids and hydro-aromatic-oxycarboxylic acids with each other by subjecting the mixture to the action of heat.

4. A process for the preparation of shellac substitutes which comprises combining mixtures of the products of the moderate oxidation of mixtures of unsaturated aliphatic acids and hydro-aromatic-oxycarboxylic acids with each other by subjecting the mixture to the action of heat in the presence of condensing agents.

5. A process for the preparation of shellac substitutes which comprises combining mixtures of oxycarboxylic acids of an aliphatic nature and the products of the moderate oxidation of resinol acids from copals or rosin with each other by subjecting the mixture to the action of heat.

6. A process for the preparation of shellac substitutes which comprises combining mixtures of oxycarboxylic acids of an aliphatic nature and the products of the moderate oxidation of resinol acids from copals or rosin with each other by subjecting the mixture to the action of heat in the presence of condensing agents.

7. A process for the preparation of shellac substitutes which comprises combining mixtures of the products of the moderate oxidation of mixtures of unsaturated aliphatic acids and the products of the moderate oxidation of resinol acids from copals or rosin with each other by subjecting the mixture to the action of heat.

8. A process for the preparation of shellac substitutes which comprises combining mixtures of the products of the moderate oxidation of mixtures of unsaturated aliphatic acids and the products of the moderate oxidation of resinol acids from copals or rosin with each other by subjecting the mixture to the action of heat in the presence of condensing agents.

In testimony whereof we affix our signatures.

JOHANNES SCHEIBER.
WALTHER NOACK.